3,544,364
SOLID HYDROXYLATED SUBSTRATE TREATED WITH A PROLONGED ODOR RELEASING COMPOSITION
Bernard Rudner, Westfield, N.J., and Joseph H. Stump, Jr., Pensacola, Fla., assignors to Tenneco Chemicals, Inc., a corporation of Delaware
No Drawing. Filed May 1, 1968, Ser. No. 725,932
Int. Cl. D21h 1/34; A45d 33/38
U.S. Cl. 117—143                                     12 Claims

ABSTRACT OF THE DISCLOSURE

A method for prolongating the release of a pleasant odor from a solid hydroxylated substrate. The method comprises applying to the hydroxylated substrate a composition containing volatile odoriferous alcohols having from six to sixteen carbon atoms and metal or metalloid alcoholates of alcohols having from six to sixteen carbon atoms, wherein the metal or metalloid component is selected from Group III and Group IV of the Periodic Table.

---

This invention relates to a method for prolonging the volatilization of pleasant smelling alcohols from hydroxylated substrates. More particularly, the invention pertains to a method for treating hydroxylated substrates such as facial tissues, cigarette papers, etc. with a composition containing volatile, odoriferous alcohols and metal or metalloid alcoholates of odoriferous alcohols whereby the release of the fragrant odor is extended over a relatively long period of time.

Fragrant or pleasant odoriferous alcohols such as methol are often applied to a variety of solid substrates for aroma improvement. It has been long recognized that the prior art treatments are transitory, since the odoriferous alcohols volatilize rapidly after exposure to ordinary atmospheric conditions and the fragrant or pleasant odor is soon dissipated. Another disadvantage resides in the loss of fragrancy when the thus treated commercial products are stored for a substantial period of time. It would be desirable, therefore, to have a method for treating organic substrates with fragrance-producing substances whereby volatilization of the pleasant odor is prolonged and storage of the commercial products is not detrimental.

One object of the present invention is to provide a method for imparting odoriferous alcohols to hydroxylated substrates which avoids the disadvantages of the prior art methods.

Another object of the present invention is to provide a method of treating a solid hydroxylated substrate with volatile odoriferous alcohols to impart the slow release of a fragrant or pleasant odor over an extended period of time after exposure thereof to ordinary atmospheric conditions.

A further object of the present invention is to provide a novel composition capable of imparting long lasting fragrant or pleasant odors when applied to or admixed with a solid hydroxylated substrates.

These and other objects of the present invention will become readily apparent from the ensuing description and illustrative embodiments.

In accordance with this invention it has now been found that a composition containing volatile, odoriferous alcohols and metal or metalloid alcoholates of volatile, odoriferous alcohols can be effectively employed to prolong the slow release of a fragrant odor for a relatively long period of time from a variety of solid hydroxylated organic or inorganic substrates including facial tissues, toilet tissues, cigarette paper, absorbent cotton, rayon dresses, linen handkerchiefs, paper toweling, paper clothing, parchment, stationery, polyvinyl alcohol, hydrolyzed vinylacetate vinyl chloride copolymers, polyethylene oxide, styrene-allyl alcohol copolymers, glass, silica, alumina gel, titanium dioxide, etc. The use of cellulosic solid substrates is especially preferred. The odor producing composition will in general contain from about 1 to 90% by weight of the free alcohol, and from about 10 to 99% by weight of the metal or metalloid alcoholates of volatile alcohols. For most purposes the free alcohol and the alcohol component of the alcoholate will be the same, although the use of different or mixtures of alcohols is also encompassed by the present invention.

The volatile, odoriferous alcohols which may be employed in preparing the compositions of this invention include aliphatic or alicyclic alcohols having from 6 to 16 carbon atoms, and preferably from 8 to 15 carbon atoms, per molecule. Illustrative alcohols are: d-menthol, 1-menthol, dl-menthol, cinnamyl alcohol, tridecyl alcohol, 2-hexanol, 2-ethylcyclohexanol, 1-allyl-1-cyclohexanol, borneol, isoborneol, mixed terpene alcohols, farnesol, geraniol, citronellol, thymol, d-linalool, cyclododecanol, o-methylphenacyl alcohol, phenethyl alcohol, p-anisyl carbinol, benzyl alcohol, etc.

The metallic derivatives of the volatile, odoriferous alcohols will have the following structural formulae:

$$(RO)_n M$$

where $n$ is 3 or 4

$$(RO)_{n-1}M\text{-}O\text{-}M(OR)_{n-1}$$

where $n-1$ is 2 or 3

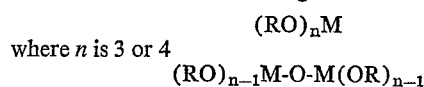

wherein $n-2$ is 1 or 2

$$(RO)_{n-x}M(OR^1)_x$$

where $n$ is 3 or 4 and $x$ is 1 to $n-1$ and wherein M is a Group III or IV metal or metalloid;

R is an alkyl or cycloalkyl radical having from 6 to 16 carbon atoms (derived from a volatile alcohol);

$R^1$ is an alkyl, cycloalkyl or heterocyclic radical having from 1 to 5 carbon atoms derived from a more volatile alcohol such as methanol, isopropyl alcohol, allyl alcohol, t-butyl alcohol and tetrahydrofurfuryl alcohol. The alcoholates are normally high boiling liquids, water-insoluble, of bland to strong odor, that are readily convertible by hydrolysis to volatile alcohols and metallic oxides or hydroxides. The rate at which these alcoholates hydrolyze is a function of both the metal or metalloid (Group III faster than Group IV and lower atomic number faster than higher atomic number, generally) as well as upon the structure of the alcohol (the higher the molecular weight and the extent of the branching near the OH group, the slower the hydrolysis). The metal or metalloid components of the alcoholates are the non-toxic, polyvalent (preferably of the highest valency) members of Groups III and IV. Illustrative metals and metalloids are as follows: aluminum, titanium, zirconium, silicon, boron.

Especially preferred materials are aluminum and silicon. It is desirable to employ the metals or metalloids in their highest valency state, since the lower valent metals or metalloids, e.g., divalent and trivalent titanium, usually form alkoxides which are highly colored, insoluble, airunstable and relatively expensive. Alkoxides or cycloalkoxides prepared from the highest valency metals or metalloids generally have the least color and the most air stability. The choice of metals or metalloids is an essential feature of the present invention. Alcoholates prepared from Groups I or II metals hydrolyze too rapidly and result in the formation of highly alkaline by-products. Magnesium cinnamylate, for example, hydrolyzes so rapidly that it releases cinnamyl alcohol as fast as the metal-free alcohol volatilizes. Sodium menthoxide, on the other hand, would burn human skin on contact or attack the cellulosic material to which it is applied. Alkoxides of Group V, VI, and VII metals would be highly colored and too expensive.

Typical metal or metalloid alkoxides which may be employed in the practice of this invention include, for example, any of the following or mixtures thereof: aluminum menthoxide, silicon menthoxide, titanium menthoxide, zirconium menthoxide, boron menthoxide, silicon tridecyloxide, tri-farnesyl borate, tri-octenylboroxine, diisopropyl isobornylaluminate, hexa-(bornyloxy)-disiloxane, tetra-tridecyl orthosilicate, butoxy-tri-(beta-phenylethoxy) stannane, tetracinnamyl titanate, etc.

Conventional procedures may be employed to prepare the metal or metalloid alcoholates. One such procedure involves the direct reaction of the active Group III or IV metal or metalloid with the volatile, odoriferous alcohol. For example, aluminum menthoxide was prepared by reacting aluminum metal with dl-menthol in the presence of an iodine-mercuric chloride catalyst to produce viscous fluid consisting of unreacted menthol and aluminum menthoxide. An alternative procedure involves transesterification of the Group III or IV metal or metalloid alkoxide, e.g., aluminum methoxide, with the odoriferous alcohol, e.g., menthol, to yield the desired metal or metalloid alcoholate such as aluminum menthoxide.

It is also possible to prepare the metal or metalloid alcoholates by methathesis reactions wherein a halide of the metal or metalloid is reacted with an alkoxide of a Group I or II metal. Silicon menthoxide has been prepared, for example, by the reaction between silicon tetrachloride and sodium menthoxide. Still another method of preparation involves the reaction of the Group III or IV metal halide with ammonia and the odoriferous alcohol.

As will be readily understood, slow release odor-producing compositions of this invention may be readily prepared by admixing the volatile, odoriferous alcohol with the metal or metalloid alcoholate of the odoriferous alcohol in the desired proportions. It is also possible, however, to employ methods for preparing the metal or metalloid alcoholates which yield useful mixtures of the odoriferous alcohol and the alcoholate, which may be employed as such or initially purified by filtration, etc.

In accordance with one feature of the present invention it is necessary to employ an appreciable concentration of the free, volatile, odoriferous alcohol in admixture with the metal or metalloid alcoholates. In the absence of the free alcohol the pleasing or fragrant odor is too slowly generated from the alcoholate alone. On the other hand, the presence of the metal or metalloid alcoholates are necessary in order to achieve the persistence of the odor.

As discussed above, the odor-producing compositions of this invention will contain a volatile aliphatic or alicyclic alcohol having from 6 to 16 carbon atoms, and a Group III or IV metal or metalloid alcoholate of a volatile, aliphatic or alicyclic alcohol having from 6 to 16 carbon atoms. For most commercial purposes the free alcohol and the alcohol component of the alcoholate will be the same. In general, the free alcohol and the metal or metalloid alcoholate are present in a ratio ranging from about 1 to 10 parts by weight alcohol to 1 to 99 parts by weight of the alcoholate. However, the exact ratio of the components may vary over even a wider range depending upon the type of substrate being treated as well as upon the end use of the product.

For some applications it has been found advantageous to incorporate a conventional humectant in the odor-producing composition. A humectant such as glycerine, ethylene glycols, polyethylene glycols, mixtures thereof and the like adds softness and body to the composition. Even more important, the humectant would ensure a constant environment of moisture, in controlled amounts, to ensure that the alcoholate component will hydrolyze to the free volatile alcohol. When employed the humectant will be present in an amount ranging from 1 to 30% by weight of the total alcohol-alcoholate composition. It is also possible to employ a solvent such as ethanol, polypropylene oxide, sorbitol mono-oleate, glyceryl monostearate, glycerine, or the like. If more body or viscosity is desired to permit the fluid composition to be applied to the substrate as a solid or semi-solid, then a thickner such as carboxymethylcellulose, algin, agar-agar, hydroxy-methylcellulose, polyvinyl alcohol, or the like may be added to the composition in the proper amounts.

The odor-producing compositions of this invention may be applied to or impregnated in the substrate by known means such as spraying, painting, dipping, printing, etc. It is also possible to admix the composition with one or more substrate components during preparation of the finished substrate product. The thus treated substrate may then be dried under ambient conditions or under mild elevated temperatures. For some purposes, the need for drying is obviated by the use of a relatively non-volatile solvent. Preferably only a minor proportion of the finished product will constitute the odor releasing composition.

The invention will be more fully understood by reference to the following illustrative embodiments.

EXAMPLE I (A) A fuming, anhydrous solution of 10 g. silicon tetrachloride in 250 ml. of commercial tridecyl alcohol (tridecanol) was treated, beneath its surface, with twice the amount of gaseous ammonia needed to convert all of the chloride to ammonium chloride. The reaction was maintained at 30–32° C. with constant stirring. When a sample of the filtrate gave no further fuming with gaseous ammonia, the mixture was filtered and the filtrate stripped under anhydrous conditions and at low temperature to remove 90% of the unreacted tridecyl alcohol. The resultant thick, yellow oil contained about 90% by weight of silicon tridecyloxide and 10% by weight of tridecyl alcohol.

(B) A small square of absorbent cotton was thoroughly wet with the thick yellow oil product obtained in Run A and then dried to the touch in a vacuum oven at 103–5° C. The treated cotton substrate repelled water droplets and retained the odor of the volatile alcohol at least three days longer than did a square of absorbent cotton similarly treated with straight tridecanol.

(C) A third square of absorbent cotton was similarly treated with a mixture of 10 g. silicon tetrachloride and 250 ml. of tridecanol. The mixture attacked the cotton and at no time gave anything other than an extremely acrid odor. The treated cotton also reacted vigorously with water (fuming and heat evolution) when tested 24 hours after application.

EXAMPLE II (A) A solution of cinnamyl alcohol, 13.5 g., in 45 ml. commercial xylene, is stirred with 5 g. dry aluminum ethoxide at 100° for 4 hours, while allowing liberated ethanol to escape, then evaporated down to dryness in vacuo at 100° and finally 2 mm. gauge overnight. The thick, yellowish non-homogeneous mixture has lost more weight than that calculated for the escape of 0.3 mole of ethyl alcohol but analysis indicates approximately a tenth of the alcohol, presumably cinnamyl, unesterified. The mixture smells markedly of cinnamyl alcohol, but not nearly as strongly as an equal weight of pure cinnamyl alcohol.

(B) The above mixture, 5 g., is treated with 1% of its weight of menthol, and equal weights (5 g.) of glycerine and of polypropylene glycol. A similar mixture is prepared from 5 g. cinnamyl alcohol, 0.05 g. menthol, 5 g. glycerine and 5 g. polypropylene glycol. Both mixtures are applied to a 2-inch-wide strip of desized white cotton cloth by drawing the length of the strips (approximately 3 ft.) between two parallel clamped, glass rods kept wet with the mixtures. Sections of each strip are kept in cork-stoppered glass jars at 35° C. for various periods of time. Initially, strip X, impregnated with the cinnamyl alcohol-menthol mixture, has a stronger odor than strip Y, if anything, too strong to be customer-acceptable. At the end of one week's storage, the jar containing strip X gives a very strong menthol-cinnamyl odor when first opened, but the strip itself, when taken out into the air, has a relatively faint cinnamyl odor and relatively little menthol-type cooling, compared to strip Y. By the end of 4 week's storage, neither jar smells strongly of methol on first being opened, but strip X is practically odorless and devoid of menthol's cooling feeling, compared to strip Y.

EXAMPLE III

A dry, air-free suspension of approximately 1.7 g. sodium borneoxide in 35 ml. dry benzene was obtained by stirring an approximately 3% solution of commercial borneol (0.01 ml.) in dry, refluxing benzene under dry nitrogen for 18 hours after the initial addition of 0.25 g. sodium at 35–50°. At benzene refluxing temperature, there was then added dropwise, over 30 minutes, 2 g. (a large excess) of titanium tetrachloride, and the mixture stirred to complete precipitation of sodium chloride for 24 hours at reflux. The mixture, at room temperature, was filtered, and the combined filtrates and washings were evaporated at 10–15° in vacuo to give a rather sharp-odored mixture. Re-evaporation of benzene solution, at room temperature and 2–15 mm. gave a thick, weak-odored oil, crude borneol titanate.

The titanate is mixed with 1 g. borneol and 1 g. thymol, then triturated into a mixture of 1 g. glycerine and 1 g. monostearin. A similar mixture is made (the control) using an additional 1.5 g. borneol, instead of the titanate. The two pastes are each smeared onto a separate sheet of absorbent paper as thoroughly and uniformly as possible. Each sheet is then separately but similarly enclosed in polyethylene film, and the film stored at room temperature for two weeks. At the end of that time, the package containing the titanate has slightly less initial odor than the package without it; but the absorbent paper without the titanate, once aired, is less-scented than the one containing titanate. When the stored papers are left out in the air 24 hours, the titanate-containing paper retains a delicate scent, and more of a cooling feeling than the almost odorless paper without the titanate.

EXAMPLE IV (A) Aluminum menthoxide compositions were prepared in two ways: transesterification of aluminum methoxide with dl-menthol and I$_2$-mercuric chloride-catalyzed reaction of aluminum with dl-menthol. The first method gave a pale green, viscous liquid with a mild but persistent menthol odor, containing approximately 50% of free menthol and the rest a mixture of $$(C_{10}H_{19}O)_nAl(OCH_3)_{3-n}$$

where $n=1-3$. A few drops of the liquid, poured on a watch glass, retained its menthol odor for three days longer than did almost twice the weight of pure menthol, in a separate watch glass. At the end of that time, the first watch glass contained a white powder, still smelling of menthol while the second watch glass was completely empty and odorless.

The second method of preparation gave a dark gray viscous fluid, smelling of menthol. The gray was due to unreacted aluminum; the rest of the composition, some 99% of the total, consisted of menthol, its simple aluminate Al(OC$_{10}$H$_{19}$)$_3$, and the first stage hydrolysis products, e.g. (C$_{10}$H$_{19}$O)$_2$AlOH and [(C$_{10}$H$_{19}$O)$_2$Al]$_2$O. As with the first preparation, its menthol odor persisted much longer than did that of a greater weight of pure menthol.

(B) The reaction of a 4:1 molar ratio of menthol and ethyl silicate in the presence of an acid catalyst (trace HCl), under nitrogen at 140° until no more ethanol distilled over, gave a colorless liquid with menthol-like odor. Analysis revealed that the mixture contained about 50% free menthol, $$(C_{10}H_{19}O)_nSi(OC_2H_4)_{4-n}$$

(where $n=1-4$), and condensed organic silicates. It was soluble in propylene glycol, polypropylene glycols, glycerine and ether; but was insoluble in water. When placed on a watch glass by itself or in a polypropylene glycol solution, it produced the most persistent pleasant odor.

(C) Tetra-n-butyl orthotitanate, 34 g. (0.1 mole) and 62.4 g. (0.4 mole) dl-menthol, with a trace of conc. HCl, was held under nitrogen at 170° C. for 1 hr., until 50% of the theoretical C$_4$H$_9$OH had collected as distillate. Analysis confirmed that the reaction mixture comprised about 50% menthol and a mixture of alcoholates $$(C_{10}H_{19}O)_nTi(OC_4H_9)_{4-n}$$

where $n=1-4$. The mixture was a colorless, menthol-smelling liquid, but slightly less soluble than the product of Run B in polypropylene glycol. An excellent odor persistence was obtained.

The above data shows that the odor-producing compositions of this invention can be readily employed in conjunction with a variety of substrates to obtain a persistent and slow release of a pleasant or fragrant aroma. Superior results are attained compared to treatments with the volatile alcohol alone. When menthol is employed as the volatile odoriferous alcohol a cooling effect is also achieved. In contrast, prior art products generally lose substantially all of the desired fragrancy after they have been exposed to atmospheric conditions for a day or two as a result of the rapid volatilization of the odoriferous alcohol.

While particular embodiments of this invention are shown above, it will be understood that the invention is obviously subject to variations and modification without departing from its broader aspects. As used herein and in the appended claims the term "metals" shall mean both the metals and metalloids of Groups III and IV of the Periodic Table, and the term "alcoholates" shall mean the metallic derivatives of the odoriferous alcohols, which are sometimes referred to as alkoxides, cycloalkoxides, etc.

We claim:
1. A solid hydroxylated substrate product treated with a prolonged odor releasing composition, said composition containing from about 1 percent to 90 percent by weight of at least one volatile odiferous aliphatic or alicyclic alcohol having from 6 to 16 carbon atoms and about 10 percent to 99 percent by weight of an alcoholate of a metal selected from the group consisting of aluminum, titanium, zirconium, silicon, boron, and tin and a volatile odiferous aliphatic or alicyclic alcohol having from 6 to 16 carbon atoms.

2. The product of claim 1 wherein the alcoholate is an aluminum alcoholate.

3. The product of claim 1 wherein the alcoholate is a silicon alcoholate.

4. The product of claim 1 wherein the first mentioned volatile odiferous alcohol is tridecyl alcohol.

5. The product of claim 1 wherein the first mentioned volatile odiferous alcohol is menthol.

6. The product of claim 1 wherein the first mentioned volatile odiferous alcohol is tridecyl alcohol and the alcoholate is metal tridecyloxide.

7. The product of claim 1 wherein the first mentioned volatile odiferous alcohol is menthol and the alcoholate is metal menthoxide.

8. The product of claim 1 wherein the first mentioned volatile odiferous alcohol is borneol and the alcoholate is metal borneoxide.

9. The product of claim 1 wherein the odor releasing composition contains a minor amount of a humectant.

10. The product of claim 1 wherein the hydroxylated substrate is a cellulosic substrate.

11. The product of claim 10 wherein the cellulosic substrate is cotton.

12. The product of claim 10 wherein the cellulosic substrate is paper.

References Cited

UNITED STATES PATENTS

| | | | |
|---|---|---|---|
| 2,218,037 | 10/1940 | Duers et al. | 239—54 |
| 2,253,655 | 8/1941 | Shurley | 117—154 |
| 2,564,860 | 8/1951 | Ryberg | 239—54 |
| 2,620,227 | 12/1952 | Iwase et al. | 239—54 |
| 2,767,018 | 10/1956 | McDonald | 239—34 |
| 2,833,669 | 5/1958 | Ziegler | 117—154 X |
| 2,991,517 | 7/1961 | Bundy | 239—34 UX |
| 3,128,772 | 4/1964 | Jarboe et al. | 131—17 |
| 3,136,319 | 6/1964 | Jarboe | 131—17 |

FOREIGN PATENTS

| | | | |
|---|---|---|---|
| 740,406 | 8/1966 | Canada | 117—121 |

WILLIAM D. MARTIN, Primary Examiner

H. J. GWINNELL, Assistant Examiner

U.S. Cl. X.R.

117—154; 424—28